United States Patent [19]

Khasanov

[11] Patent Number: 5,180,429

[45] Date of Patent: Jan. 19, 1993

[54] MAGNESIA CONCRETE

[75] Inventor: Robert M. Khasanov, Krasnogorsk, U.S.S.R.

[73] Assignee: Steven M. Lasell, Ashland, Oreg.

[21] Appl. No.: 796,343

[22] Filed: Nov. 22, 1991

[51] Int. Cl.$^5$ ................................. C04B 9/02
[52] U.S. Cl. ...................... 106/685; 106/688
[58] Field of Search ................... 501/685, 688

[56] References Cited

U.S. PATENT DOCUMENTS

| | | | |
|---|---|---|---|
| 449,151 | 3/1891 | Enricht . | |
| 449,214 | 3/1891 | Enricht . | |
| 483,565 | 10/1892 | Maardt . | |
| 1,922,473 | 1/1931 | Schmedes | 91/68 |
| 1,988,125 | 8/1927 | Kidwell | 134/46 |
| 2,466,145 | 5/1945 | Austin et al. | 106/106 |
| 2,526,837 | 4/1948 | Woodward | 106/106 |
| 3,447,938 | 6/1969 | Vassilevsky | 106/105 |
| 4,209,339 | 6/1980 | Smith-Johannsen | 106/106 |
| 4,339,274 | 7/1982 | Duyster et al. | 106/106 |
| 4,838,941 | 6/1989 | Hill | 106/106 |
| 5,004,505 | 4/1991 | Alley et al. | 106/685 |
| 5,039,454 | 8/1991 | Policastro et al. | 252/610 |

Primary Examiner—Karl Group
Assistant Examiner—Chris Gallo
Attorney, Agent, or Firm—Jacobson, Price, Holman & Stern

[57] ABSTRACT

A magnesium concrete which comprises magnesium oxide in about 100 parts; magnesium chloride in a range of about 40 to about 80 parts; mineral aggregates in a range of about 300 to about 500 parts; sublimates of carnallite chlorates in a range of about 20 to about 40 parts; and sodium siliceous-fluoride in a range of about 1 to about 2 parts.

2 Claims, No Drawings

MAGNESIA CONCRETE

BACKGROUND OF THE INVENTION

1. Field of the Invention

The present invention relates to a building material which may be used for making floors in industrial, public and residential buildings. Specifically, the present invention relates to a magnesia concrete.

2. Prior Art

U.S.S.R. Inventor's Certificate no. 749809 disclosed a magnesia concrete which consists of the following components, by weight:

| | |
|---|---|
| Magnesium oxide | 5–6.5 parts |
| Magnesium chloride | 3.5–4.2 parts |
| Futile spirit | 0.03–0.06 parts |
| Slag-heap from the copper-nickel production industry | 8–10 parts |
| Calcium chloride | 0.7–1.2 parts |
| Mineral aggregate | 7–9 parts |

The floors using this mixture were of high-strength and were water-resistant. However, during the usage of these floors, the calcium chloride which is in an uncombined state was washed out. Thus, this decreased the floor's quality and caused the floors to prematurely fall apart.

In a second U.S.S.R. Inventor's Certificate, no. 923993, another magnesia concrete was taught which consists of the following components, by weight:

| | |
|---|---|
| Magnesium oxide | 4–5 parts |
| Magnesium chloride | 2.5–3.5 parts |
| Mineral aggregate | 18–30 parts |
| Carbonate-contained slime | 1.0–1.5 parts |
| Ethyl ether of a orthosilicic acid | 0.05–0.07 parts |

Although, the silicon-organic admixture added to this mixture reduces hydroscopicity of the floor and increases its water resistance, the carbonate-contained slime which has alkaline properties prevents the full process of the magnesium oxychloride formation. Consequently, this leads to deterioration of the parameters of the floors.

In addition, the floors made of either of the above-mentioned compositions have a comparatively high penetrability to oil products. Thus, this limits the field of use of the floors.

The relatively large amounts of magnesium chloride and the fact that the water solution of the required concentration should be prepared beforehand are also shortcomings of these known cements.

In the past aluminum chloride and iron have been used in the cement-concrete mixtures as setting accelerator for portland cement.

It is also known that sodium siliceous-fluoride is used in combination with water glass as a setting catalyst for the latter.

SUMMARY OF THE INVENTION

An objective of the present invention is to reduce penetrability of oil products and shrinkage deformations of the magnesia concrete floors.

This objective is achieved by the use of sublimates of carnallite chlorates and sodium siliceous-fluoride as an admixture to a magnesia mixture that comprises magnesium oxide, magnesium chloride and mineral aggregate. The magnesia concrete comprises, by weight: magnesium oxide in about 100 parts; magnesium chloride in a range of about 40 to about 80 parts; mineral aggregates in a range of about 300 to about 500 parts; sublimates of carnallite chlorates in a range of about 20 to about 40 parts; and sodium siliceous-fluoride in a range of about 1 to about 2 parts.

BRIEF DESCRIPTION OF THE INVENTION

The magnesia concrete comprises, by weight: magnesium oxide in about 100 parts; magnesium chloride in a range of about 40 to about 80 parts; mineral aggregates in a range of about 300 to about 500 parts; sublimates of carnallite chlorates in a range of about 20 to about 40 parts; and sodium siliceous-fluoride in a range of about 1 to about 2 parts.

The process for producing the magnesia concrete, comprises the steps of preparing a water solution of magnesium chloride. Adding the sublimates of carnallite chlorates and sodium siliceous-fluorine to the magnesium chloride solution. Mixing in a mixer the magnesium oxide and mineral aggregates and then adding the resulting dry mixture to the water solution of magnesium chloride with admixture. The magnesia concrete is then ready for use for the designed purpose.

Other features of the invention and the advantages thereof will become apparent from the detailed description below.

DETAILED DESCRIPTION OF THE INVENTION

The invention will now be described in detail with reference to the following formula which is the preferred formulation of the invention.

The ingredients for the product are as follows, by weight: magnesium oxide in about 100 parts; magnesium chloride in a range of about 40 to about 80 parts; mineral aggregates in a range of about 300 to about 500 parts; sublimates of carnallite chlorates in a range of about 20 to about 40 parts; and sodium siliceous-fluoride in a range of about 1 to about 2 parts.

The sublimates of carnallite chlorates (hydrous potassium magnesium chloride, $KMgCL_3 \times 6H_2O$) are a powder-like waste products of the titanium-magnesium process industry with specific sizes of up to 250 sq. meter kg.

The chemical composition of the carnallite sublimates is as follows, in percent of mass:

| | |
|---|---|
| Mg | 5 |
| K | 18 |
| Na | 23 |
| Fe | 2 |
| Al | 3 |
| C | 1.5 |
| Cl | 47.5 |

The process for making the magnesia mixture comprises several steps. A water solution of magnesium chloride is prepared. The sublimates of carnallite chlorates and sodium siliceous-fluorine are added to the magnesium chloride solution when mixing.

Magnesium oxide, mineral aggregates are mixed in a mixer and the resulting dry mixture is mixed with the water solution of the magnesium chloride with admixture. The resulting magnesia concrete is ready for use for its designated purpose.

Tables 1 and 2 provide some embodiments of the present invention and their properties.

TABLE NO. 1

The examples of the magnesia concrete of the present invention

| Components | Examples of the composition, parts by weight | | | | | |
|---|---|---|---|---|---|---|
| | 1 | 2 | 3 | 4 | 5 | 6 |
| Magnesium oxide | 100 | 100 | 100 | 100 | 100 | 100 |
| Magnesium chloride | 40 | 60 | 80 | 40 | 50 | 60 |
| Sublimates of carnallite chlorate | 20 | 30 | 40 | 30 | 40 | 25 |
| Sodium siliceous-fluoride | 1 | 1.5 | 2 | 1.5 | 1 | 1.5 |
| Mineral aggregate: | | | | | | |
| -crushed granite | 200 | 200 | 300 | 200 | 250 | 100 |
| -quartz sand | 100 | 100 | 200 | 50 | 50 | 100 |
| -milled quartz sand | — | 50 | — | 50 | — | 100 |
| -marshalite | — | — | — | — | 50 | — |

TABLE NO. 2

Physical and mechanical properties of the magnesia mixture compositions

| Properties | Examples of the composition | | | | | | USSR Cert. no. 923993 |
|---|---|---|---|---|---|---|---|
| | 1 | 2 | 3 | 4 | 5 | 6 | |
| Compression strength (MPa) | 55 | 63 | 58 | 58 | 60 | 57 | 60 |
| Impenetrability in respect of oil products MPa: | | | | | | | |
| -kerosene | 15 | 18 | 15 | 17 | 15 | 16 | 8 |
| -emulsole | 20 | 22 | 20 | 20 | 20 | 20 | 10 |
| Softening ratio in respect of oil products: | | | | | | | |
| -kerosene | 0.88 | 0.90 | 0.91 | 0.85 | 0.85 | 0.88 | 0.57 |
| -emulsole | 0.90 | 0.95 | 0.93 | 0.95 | 0.90 | 0.91 | 0.68 |
| Detrition, g. per sq. cm. | 0.25 | 0.20 | 0.23 | 0.20 | 0.25 | 0.21 | 0.38 |
| Shrinkage, mm per m | 0.20 | 0.15 | 0.20 | 0.18 | 0.20 | 0.17 | 0.50 |

The physical and mechanical properties of the magnesia concrete of the present invention as provided in Table II demonstrate the improved qualities of the magnesium concrete of the present invention over that disclosed in U.S.S.R. Inventor's Certificate no. 923,993. The addition of the sublimates of carnallite chlorates and sodium siliceous-fluoride as admixtures, increases dramatically the impenetrability of the magnesia concrete floors of the present invention to oil products. For example, impenetrability with respect to kerosene is 22 MPa for the present invention; whereas, it is 10 MPa for floor made of the U.S.S.R. Inventor's Certificate no. 923,993.

The floors made of the magnesia concrete of the present invention retains the high strength after being in contact with oil products for a long time. In particular the magnesia concrete of the present invention showed a strength loss of only 10–12% after exposure to kerosene during 1.5 years, while that for U.S.S.R. Inventor's Certificate no. 923,993 is above 40%.

Moreover the floors made of the magnesium concrete of the present invention have almost two times less shrinkage and thus less contraction cracking than the floors made of the concrete taught in U.S.S.R. Inventor's Certificate no. 923,993.

The sublimates of carnallite chlorates contribute to a more full processing of the magnesia binder formation together with magnesium hydrochlorides. Furthermore sodium siliceous-fluoride reacts with the present invention, which has an acid media, to form siliceous-hydrofluoric acid. The latter reacts with magnesium oxide to form fluorine salts which provide a compact matrix of the magnesia binder.

The foregoing description of the invention has been made with references with a few preferred embodiments. Persons skilled in the art will understand that changes and modifications can be made in the invention without departing from the spirit and scope of the claims as follows.

I claim:
1. A magnesium concrete comprising:
   magnesium oxide in about 100 parts; magnesium chloride in a range of about 40 to about 80 parts; mineral aggregates in a range of about 300 to about 500 parts; sublimates of carnallite chlorates in a range of about 20 to about 40 parts; and sodium siliceous-fluoride in a range of about 1 to about 2 parts.
2. A process for producing a magnesia concrete, comprising the steps of:
   a) preparing a water solution of magnesium chloride;
   b) adding sublimates of carnallite chlorates and sodium siliceous-fluorine to the magnesium chloride solution of step a);
   c) mixing in a mixer magnesium oxide and mineral aggregates; and
   d) adding the resulting dry mixture of step c) to the water solution of magnesium chloride of step b).

* * * * *